No. 764,601. PATENTED JULY 12, 1904.
C. A. KUENZEL.
APPARATUS FOR PRODUCING COMBUSTIBLE GAS FROM PETROLEUM OIL
OR OTHER HYDROCARBON FLUIDS.
APPLICATION FILED APR. 8, 1903.
NO MODEL. 2 SHEETS—SHEET 1.
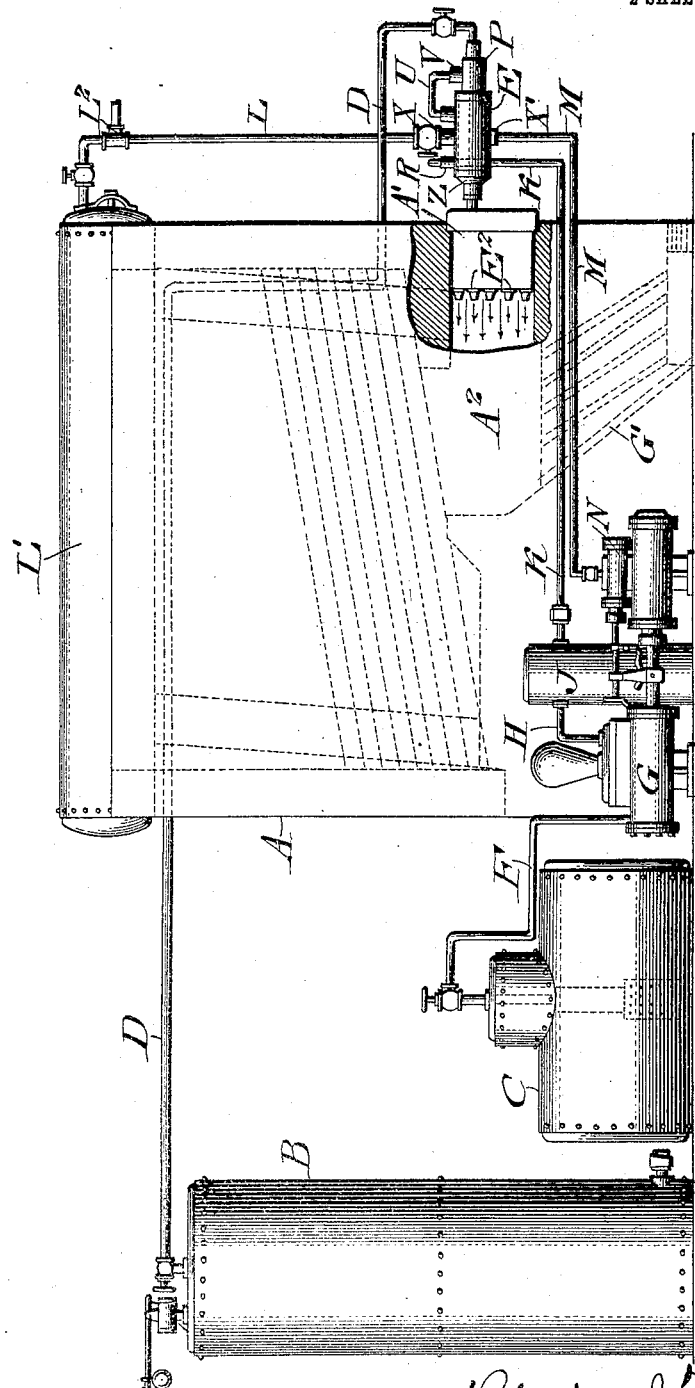

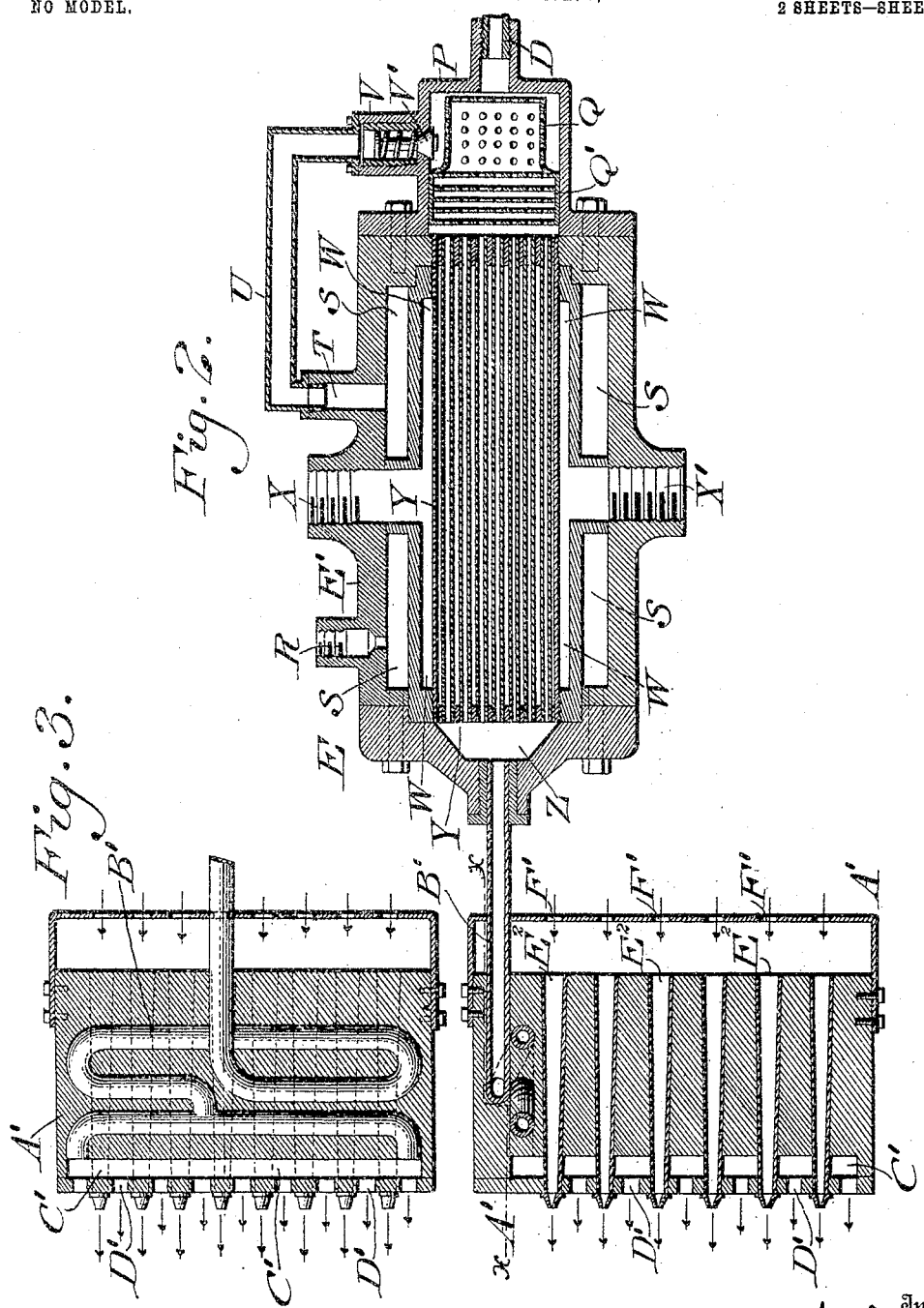

No. 764,601. Patented July 12, 1904.

UNITED STATES PATENT OFFICE.

CHARLES A. KUENZEL, OF BROOKLYN, NEW YORK.

APPARATUS FOR PRODUCING COMBUSTIBLE GAS FROM PETROLEUM-OIL OR OTHER HYDROCARBON FLUIDS.

SPECIFICATION forming part of Letters Patent No. 764,601, dated July 12, 1904.

Application filed April 8, 1903. Serial No. 151,568. (No model.)

*To all whom it may concern:*

Be it known that I, CHARLES A. KUENZEL, a citizen of the United States, residing in Brooklyn, in the county of Kings, State of New York, have invented new and useful Improvements in Apparatus for Producing Combustible Gas from Petroleum - Oil or other Hydrocarbon Fluids, of which the following is a specification.

My invention consists of an apparatus for producing combustible gas from crude petroleum-oil and other hydrocarbon fluids, the same embodying means for highly heating oil or fluid and highly-heated air, breaking up the oil so as to cause a thorough commingling of the air therewith and effectively vaporizing the same, then reheating the vapor, and compressing and superheating the same, in which condition it is injected into a furnace or other place of use, into which an additional volume of hot air may be also injected, thus causing a perfect vaporization of the oil or fluid, the resultant gas being dry and highly volatile without liability to return to its natural condition or carbonize, while a large volume of gas of highly-combustible nature is produced.

Figure 1 represents a side elevation of an apparatus for producing combustible gas embodying my invention. Fig. 2 represents a longitudinal vertical section of a portion thereof on an enlarged scale. Fig. 3 represents a transverse horizontal section on line $x$ $x$, Fig. 2.

Similar letters of reference indicate corresponding parts in the figures.

Referring to the drawings, A designates a steam boiler or generator, and B designates a reservoir for compressed air, and C designates a tank for containing crude petroleum-oil or other hydrocarbon fluid.

D designates a pipe which leads from the reservoir B, is passed through the generator A, so as to be highly heated by the same, and is connected with what I term the "mixer" E.

F designates a pipe which leads from the tank C to a pump G, and H designates a pipe which extends from said pump to the oil-supply vessel J.

K designates a pipe which leads from said vessel J to the mixer E.

L designates a steam-conveying pipe which is connected with the donkey-boiler L' and extends to and is connected with said mixer E, and M designates a pipe leading from said mixer to the valve-chamber N of the pump G. The mixer consists of a casing E', having at one end the primary chamber P, which contains the perforated diaphragms Q Q' and is connected with the air-conveying pipe D, the supply-port R, which leads to the oil-receiving chamber S within said casing, and the discharge-port T, which leads from said chamber S.

U designates a pipe which extends from said port T to the port V on the chamber P and forms a communication between chambers S and P. Within the port V is the check-valve V', which acts to prevent the heated air from entering the oil system, whereby an explosive gas might be formed therein. Within the casing E' is the steam space or chamber W, communicating with which are the ports X X' for the passage of steam to and from said space W, the port X being connected with the pipe L, which leads from the boiler L'. Within said steam-space are the flues Y, which are in communication at one end with the chamber P of the mixer and at the other end with the compression-chamber Z in the casing E'.

A' designates a head which is mounted on the support of the boiler A, adjacent to the combustion-chamber $A^2$ of the furnace thereof, and containing a coil of superheating-pipe B', one end of which is connected with the chamber Z of the mixer, and its other end is bifurcated and in communication with the channel C' in the head A', said channel being in communication with the series of passages D' in said head A', the inner ends of said passages opening into said combustion-chamber $A^2$. In said head are a series of ports $E^2$, which are in communication with the atmosphere through the openings F' at one end of said head A' and at the other end are in communication with the combustion-chamber $A^2$.

For primarily starting the apparatus I employ the steam from the donkey-boiler, the same entering the mixer E. Simultaneously therewith air enters said mixing-chamber from the pipe D and oil is directed into said chamber from the tank C through the medium of the pump G and the intermediate pipes F H K and the vessel J, after which the valve of the steam-pipe L is closed, but may be continued to the pump G to operate the same. As the steam enters the mixer it highly heats the oil-receiving chamber S and the flues Y, while at the same time the air from the reservoir A is highly heated in its passage through the boiler, in which condition it enters the chamber P. The oil which now in highly-heated condition escapes from the pipe U into the pipe V and from the latter into the chamber P being broken up by the diaphragms Q Q', the hot air and heated oil now commingling in said chamber are passed through the flues Y, where they are further subjected to the heat thereof, and thus effectively volatilized, forming a dry and highly-combustible gas which is directed into the pipe B', whereby it is superheated, in which condition it enters the channel C' and the passages D' and is injected into the combustion-chamber $A^2$. Air also enters the head A' through the openings F' and passing through said head, whereby it is highly heated, it is also injected into the combustion-chamber of the furnace and mixing with the same produces a flame of great volume and heat. In order to supply air to the combustion-chamber, I employ the ducts G', which are formed in the support of the boiler and are in communication with the atmosphere through suitable inlets in said support and lead to said combustion-chamber, as shown in Fig. 1.

In practice the casing of the mixer is formed of separate parts, constituting the oil-receiving chamber S, the steam-space W, the crown-sheets of the flues Y, the chamber P, and the caps of the casing, said parts being suitably connected by bolts and provided with the inlet and outlet pipes, as shown in Fig. 2.

Suitable valves are applied to the pipes D L K, &c., for evident purposes.

Having thus described my invention, what I claim as new, and desire to secure by Letters Patent, is—

1. In an apparatus for producing combustible gas from liquid hydrocarbon and air, a combustion-chamber, a steam-chamber, a hydrocarbon-chamber exterior of said combustion-chamber and adjacent said steam-chamber and adapted to receive heat from said steam-chamber, means for heating a supply of air, means for commingling said heated air with the hydrocarbon heated in said chamber and a flue passing through said steam-chamber adapted to convey such heated fluids toward the point of combustion.

2. In an apparatus for producing combustible gas from liquid hydrocarbon and air, a casing, a steam-chamber in said casing, a hydrocarbon-chamber in said casing adjacent said steam-chamber and adapted to be heated thereby, means for conveying the hydrocarbon heated in said chamber to a commingling-chamber, means for preheating and for conveying to said commingling-chamber a supply of air and a flue leading from said commingling-chamber through said steam-chamber.

3. In an apparatus for producing combustible gas from liquid hydrocarbon and air, a casing, a steam-chamber in said casing, a hydrocarbon-chamber in said casing adjacent said steam-chamber and adapted to be heated thereby, means for conveying the hydrocarbon heated in said chamber to a commingling-chamber, means for preheating and for conveying to said commingling-chamber a supply of air, a perforated diaphragm in said commingling-chamber and a flue leading from said commingling-chamber through said steam-chamber.

4. In an apparatus for producing combustible gas from liquid hydrocarbon and air, a casing, a steam-chamber in said casing, a hydrocarbon-chamber in said casing adjacent said steam-chamber and adapted to be heated from said steam-chamber, a commingling-chamber, means for conveying the hydrocarbon heated in said hydrocarbon-chamber to said commingling-chamber, means for preheating and for conveying to said commingling-chamber a supply of air, a compression-chamber and a flue leading from said commingling-chamber through said steam-chamber to said compression-chamber.

CHARLES A. KUENZEL.

Witnesses:
BERNHARD KLEIN, Jr.,
GEORGE WOHLPART.